Figure 1:
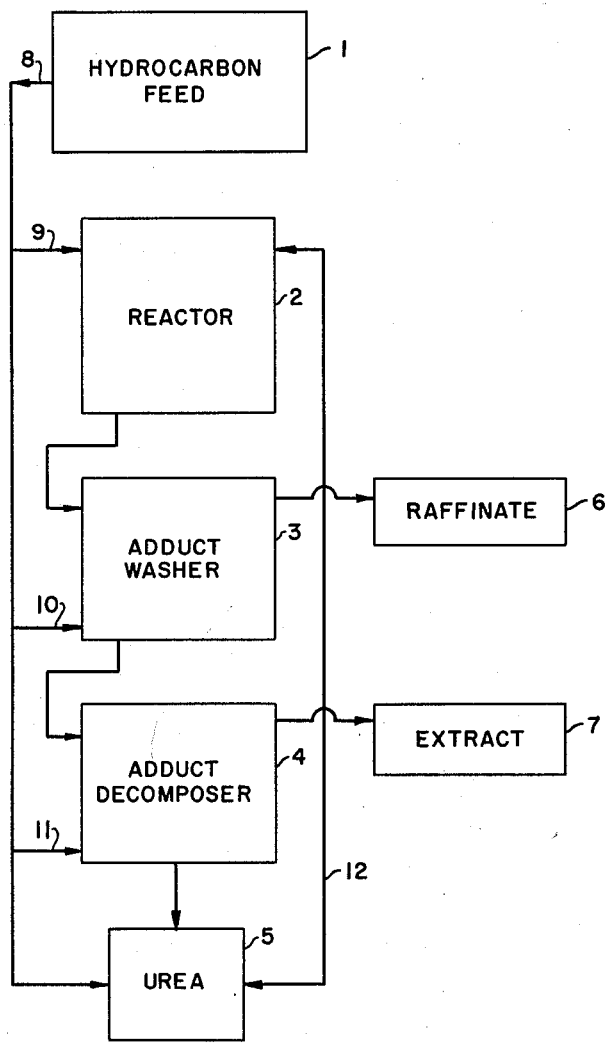

INVENTORS:
GEORGE E. LIEDHOLM
WILLIAM V. MEDLIN
CURTIS C. WILLIAMS, III
BY: *William H. Myers*
THEIR AGENT

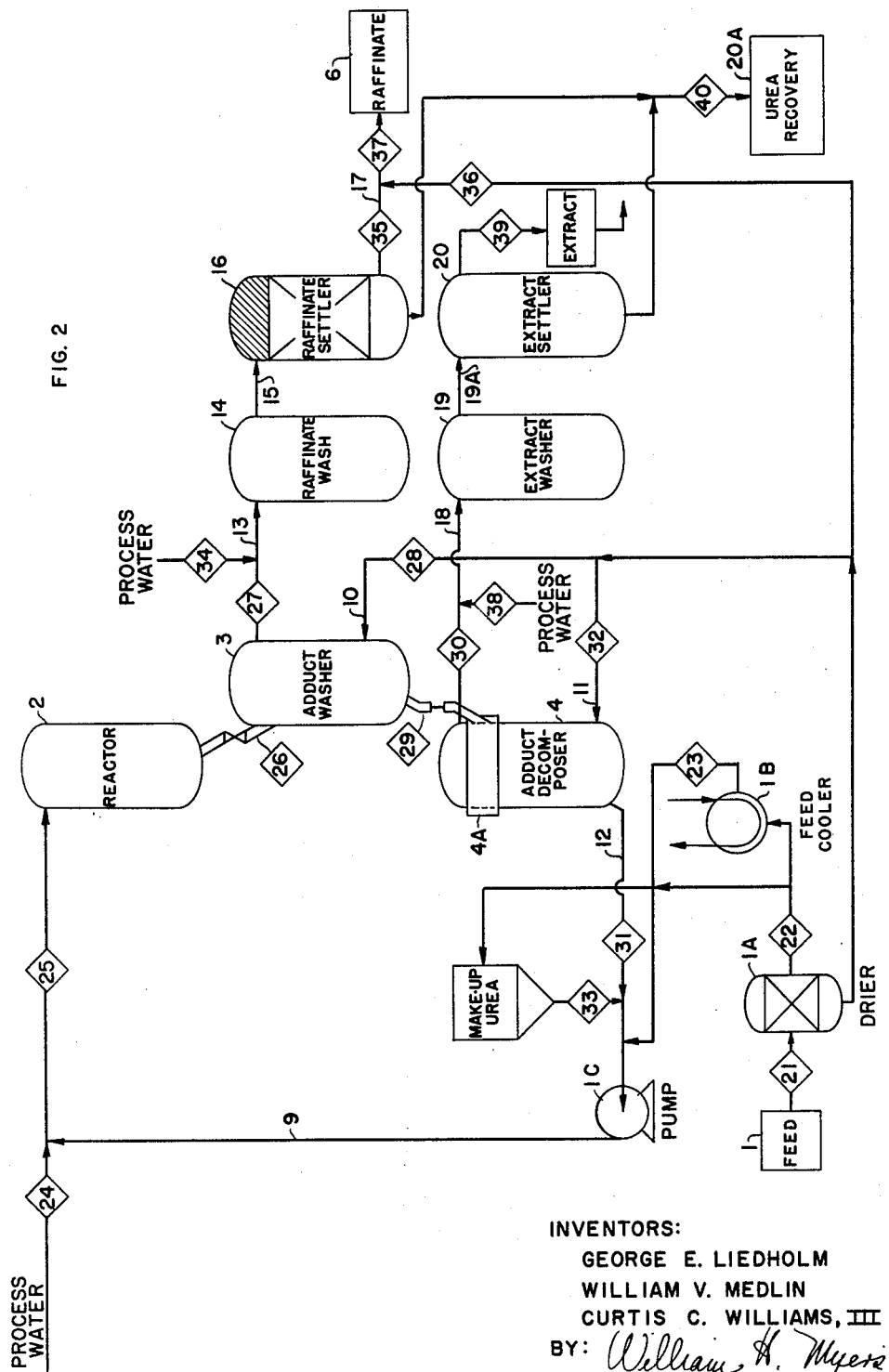

United States Patent Office 3,146,225
Patented Aug. 25, 1964

3,146,225
SEPARATION OF HYDROCARBONS BY UREA
ADDUCT FORMATION
George E. Liedholm, William V. Medlin, and Curtis C.
Williams III, Berkeley, Calif., assignors to Shell Oil
Company, a corporation of Delaware
Filed Aug. 17, 1959, Ser. No. 834,170
5 Claims. (Cl. 260—96.5)

This invention relates to a process for the separation of organic compounds. In one of its aspects, this invention relates to a process for resolving mixtures of an organic compound reactive to form a solid adduct with an amide selected from the group consisting of urea and thiourea and an organic compound non-reactive with the same amide. Still more particularly, the process comprises the above type of solid adduct formation and separation which avoids the use of filtration steps and of certain distillation requirements.

Processes are known for the separation of organic compounds having one type of molecular arrangement from a class of compounds having a different molecular arrangement by selective adduct formation with urea or thiourea. Thus, straight-chain hydrocarbons can be separated, individually or as a class, from branched-chain and/or cyclic hydrocarbons. This process depends upon the peculiar property of urea ($CO(NH_2)_2$) which permits it to form adducts with organic compounds having straight carbon atom chains and yet not to form adducts with branched-chain or cyclic organic compounds. Thus, in such a process, it is possible to separate n-octane from 2,2,4-trimethylhexane, isooctane or other branched-chain hydrocarbons, irrespective of their boiling points. Also, straight-chain hydrocarbons can readily be separated from cyclic hydrocarbons, such as benzene, toluene or the cyclo-paraffins, irrespective of the boiling points of the various components of the mixture thereof.

While urea forms adducts with organic compounds having straight carbon atom chains, another amide, viz., thiourea ($CS(NH_2)_2$), forms adducts with organic compounds having branched carbon atom chains. Thus, the adduct-forming property of thiourea permits a ready separation of such organic compounds from organic compounds having straight carbon atom chains, since the latter do not form adducts with thiourea.

Two general types of processes have been devised for the preparation of such molecular adducts. One of these comprises the use of an aqueous or alcoholic solution of the amide compound (urea or thiourea) which requires the circulation of a solution of the amide and the construction of proper equipment to handle liquid to liquid contact, recycling of depleted amide solutions and other complications which it would be best to avoid. On the other hand, methods have been devised for the use of the amide in essentially solid condition which may be used as a moving "fluid" mass of amide particles.

In the prior processes, involving amide adduct formation, complications arise relative to the plugging of filters, the recovery of separated materials in their proper form, the economic separation of mixtures without resorting to unduly expensive purification procedures and other problems. One of the principal problems entailed in the adduct formation as described above comprises the tendency of the urea and crystalline adducts in their crystalline form to be contaminated with surface coatings of an adherent film of the liquid components present in the reaction mixture. Thus, the adducts are contaminated with a liquid film of the same material from which the primary objective is complete separation. These films degrade the purity of the adducts and of any regenerated urea.

Numerous procedures have been advanced for the partial correction of these disadvantages. For the most part these processes propose the use of a washing liquid which is normally a low molecular weight material, such as liquid butane or pentane and the like. Such wash liquids, of course, require eventual separation from the components being fractionated and also require that the system be kept under a pressure sufficient to maintain the liquid condition of the low molecular weight washing solvent. On the other hand, other procedures have been proposed for the use of either the non-adducted components of the original mixture or of regenerated adducted components as the washing material. The economic disadvantage of such procedures is immediately evident since the recycling of them obviously reduces the efficiency of the process. The use of filters is undesirable in processes involving these molecular adducts since it has been found that they form extremely fine fluffy crystals having poor filtration characteristics.

It is the principal object of the present invention to improve the process of amide adduct formation and separation. It is another object of the invention to provide a process for the fractionation of mixtures of organic compounds which avoids the use of filtration or equivalent separation steps. It is a further object of the invention to provide an adduct-forming process which avoids the use of washing liquids which are dissimilar from and must be separated from the components of the mixture of organic compounds being fractionated. It is a particular object of the invention to provide an improved and efficient process for the preparation of petroleum hydrocarbons having improved pour point characteristics, freezing point characteristics and octane ratings. Other objects will become apparent in the following detailed discussion of the invention, which is made with reference in part to the accompanying drawing, wherein:

FIGURE 1 is a schematic representation of the essential process steps of the present invention; and FIGURE 2 is a schematic process flow diagram of an effective plant for the practice of the invention.

Now, in accordance with the present invention, an improved process for adduct-formation and organic compound mixture fractionation is provided in which the organic compound mixture and adduct-forming amide are contacted under adduct forming conditions, the resulting mixture of remaining liquid organic compounds, the crystalline adducts and any remaining crystalline urea are transmitted to a vertically positioned adduct washer at a point intermediate the top and bottom thereof, a washing portion of the original feed organic compound mixture being introduced into the bottom of the washing vessel and being passed upwardly therethrough, countercurrent to the descending solid particles of adduct, the raffinate (non-adducted components of the original feed) and the wash liquid being removed from the top of the washing vessel; passing the washed adduct from the bottom part of the washing vessel to a vertically-positioned adduct-decomposing vessel at a point intermediate the top and bottom thereof, heating the adduct to a temperature sufficient to decompose the latter and regenerate solid adduct-forming amide and liquid components extracted by adduct formation from the original feed mixture, introducing a second portion of the original feed mixture as a wash near the bottom part of the adduct decomposing vessel; passing the wash liquid upwardly through the decomposing vessel countercurrent to the descending particles of regenerated amide, removing from the top part of the adduct-decomposing vessel the extract (components of the original feed mixture regenerated from their adduct with the amide) and the wash liquid; and recycling the regenerated amide from the bottom portion of the adduct decomposing vessel to the adduct-forming vessel for treatment of further quantities of the original feed mixture.

This invention provides in its most preferred version an improved process for the fractionation of petroleum hydrocarbons and more particularly the removal of straight-chain hydrocarbons from petroleum fractions boiling in the kerosene to lubricating oil ranges. The removal of at least some of such normal hydrocarbons by this method from these petroleum fractions results primarily in the reduction in the freezing point of the mixtures, thus producing low pour point lubricating oil and low freezing point fuel or fuel components particularly useful as aircraft engine fuels.

The essential steps of the process are best described by reference to FIGURE 1. The process equipment provides a hydrocarbon feed zone 1, a reactor 2, an adduct washer 3, an adduct decomposer 4, a urea accumulator 5, and storage tanks for the raffinate and extract fractions of the feed, 6 and 7, respectively.

In a continuous operation in which urea is used to remove n-paraffins from a hydrocarbon feed, the feed is fed by lines 8 and 9 from the source 1 to the reactor 2 together with urea from source 5 by means of line 12. The urea forms complexes with the substantilly straight-chain components of the hydrocarbon feed in the reactor and is passed together with the non-adducted liquid components of the hydrocarbon feed to the adduct washer 3 at a point intermediate the top and bottom of the washer. A washing amount of the hydrocarbon feed from source 1 is conducted by lines 8 and 10 to the bottom part of the adduct washer 3, conditions being adjusted such that it passes upwardly through the washer and countercurrent to descending solid adduct particles which are washed in this process so as to remove occluded liquid hydrocarbon components.

The non-adducted components of the hydrocarbon feed, referred to hereinafter as the raffinate, and the ascending liquid wash are removed from the top part of the adduct washer and sent to the raffinate storage compartment 6. The washed adduct is removed from the bottom portion of the adduct washer and passed to the adduct decomposing zone 4 at a point intermediate the top and bottom. A further portion of the original hydrocarbon feed from storage zone 1 is introduced in the bottom part of the adduct decomposer by means of line 11 and passed upwardly therethrough countercurrent to descending crystals of regenerated urea. Urea is regenerated in the intermediate part of the adduct decomposing zone by means of heat, whereby the molecular adducts of substantially straight chain hydrocarbons and urea are regenerated to form crystalline urea and liquid hydrocarbon, the latter being referred to hereinafter as the "extract." The extract and ascending hydrocarbon feed wash are removed from the upper part of the adduct decomposing zone and sent to the extract storage compartment 7. The washed regenerated urea is then recycled by means of line 12 to the reactor zone 2, with optional intermediate storage of the urea in zone 5.

FIGURE 1 illustrates the two principal advantages of the process of this invention, wherein the use of filtration apparatus is avoided and the use of extraneous wash liquids are also avoided.

The use of portions of the original hydrocarbon feed as wash liquids for both the adduct and the urea results in a modification of both the raffinate and the extract. However, conditions of the process are adjusted to such a point that the extract and raffinate have substantially altered compositions from the original feed hydrocarbon mixture. More specifically, the raffinate combined with the wash from the adduct washer has a substantially lower normal paraffin content than the original hydrocarbon feed mixture, thus resulting in a hydrocarbon mixture having a reduced freezing point and pour point. On the other hand, the extract combined with the wash from the adduct decomposer has a substantially higher normal paraffin content which may be utilized for further purposes as desired.

The process of the invention is most successfully carried out by the use of the so-called rotating disc contactors for both the adduct washing zones and the adduct decomposing zones. The contactors are fully described in Reman patent, U.S. 2,601,674. Briefly, the rotating disc contactor comprises a vertically disposed column having a plurality of annular stationary baffles fixed within the column or tubular shell extending from the shell wall to a central opening and dividing the shell into a series of compartments. The apparatus also comprises a rotating shaft extending axially with respect to the shell through these openings and a plurality of disc-like rotator baffles fixed to the shaft. Each baffle is preferably only within one of the compartments and displaced a substantial distance axially from the stationary baffles, the rotator baffles being smaller than the opening in the stationary baffle, at least toward one end of the shell. Hence, the shaft and rotator baffles can be moved through the openings toward the one end of the shell. The shell also contains openings for introducing and discharging fluids and solids as desired. In the present case, at least three openings are provided, one at the top of the shell for the removal of liquid components; one at an intermediate point between the top and bottom for the introduction of liquids together with solids; and one at the bottom of the shell for the removal of washed solids. The discs are rotated in accordance with their intended use at such a speed that the solids present, namely, either adduct or regenerated urea, gradually descend from their intermediate point of introduction while the liquid with which they are originally mixed, namely, either non-adducted hydrocarbons or regenerated hydrocarbons, pass out of the top of the shell together with wash hydrocarbon feed introduced in the bottom portion of the shell.

Dependent upon the objective and the specific identity of the mixture of hydrocarbons being fractionated by this process, the proportion of urea and the time and temperature of residence in the reaction vessel may be varied over relatively wide limits. While reference will be made for the most part to the fractionation of petroleum hydrocarbon mixtures and particularly to kerosenes and lubricating oils, other mixtures of organic compounds as more fully referred to hereinafter may be employed. When utilizing most mixtures, however, and specifically petroleum hydrocarbon mixtures, it is preferred that the reaction vessel be maintained at a temperature between about 50 and about 115° F. Since the adduct-forming process is an exothermic process, it may be necessary to provide means for cooling, preferably indirect means. However, direct means, such as the evaporation of normally gaseous hydrocarbons may be utilized if desired but such would ordinarily complicate the processing details. The proportion of urea to hydrocarbon feed will vary widely dependent upon the ratio of normal hydrocarbons in the feed and the predetermined requirement for their removal, which may be either complete or any fraction thereof. Assuming that the feed hydrocarbons contain an amount of adduct-forming hydrocarbons in the order of 1–25% by weight of the feed, the amount of adduct-forming amide (urea or thiourea) is preferably between about 10 and about 50 parts by weight per 100 parts of the total feed. Expressed in different terms it is preferably between about 100 and about 500 parts by weight per 100 parts by weight of the adduct-forming components of the feed. Usually the adducts contain about 330 parts by weight of urea for each 100 parts by weight of normal hydrocarbon.

The residence time in the reactor will depend somewhat upon the average temperature in the reactor and the average chain length or molecular weight of the adduct-forming organic compound components.

In the adduct-forming process according to the invention wherein urea is present in essentially solid form, it is necessary to employ an activating amount of a relatively low molecular weight polar compound in which a small amount of the adduct-forming amide is soluble. By this is meant a compound which will dissolve the adduct-forming amide but not in the quantities in which it is to be employed. Water and low molecular weight aliphatic alcohols, such as methanol, are preferred. In order to maintain the adduct-forming amide in essentially solid form in the process and at the same time to provide the necessary degree of activation for relatively rapid formation of molecular adducts, it is preferred that water be employed in an amount between about 0.03 and about 3 percent by weight based on urea and that low molecular weight aliphatic alcohols be utilized in an amount between about 1 and about 5 percent by weight based on oil. Of course, these materials may be utilized as the sole activator or mixtures of them may be employed. Water is preferred since it does not entail later separation procedures insofar as complication of apparatus and process steps are concerned.

The residence time in the reactor will depend in part not only upon the identity and ratio of the adduct-forming hydrocarbons and the temperature at which they are present together with the adduct-forming amide but also upon the specific identity and ratio of the activating amide solvent which is utilized. When the amount of activator is employed in the general ranges described above, the residence time in the reactor will normally be between about 1 and about 30 minutes. The residence time will vary quite widely but when petroleum hydrocarbons are being fractionated according to this process and these are kerosene or lubricating oil fractions the residence time is relatively short, normally in the order of between about 2 and about 20 minutes.

The conditions in the adduct washer 3 are not particularly critical, the only requirement being that the temperature and other conditions are such that the adduct is not decomposed therein. This is simply controlled by maintaining the temperature at a level below the decomposition temperature of the adduct. The proportion of hydrocarbon feed introduced into the bottom of the washer 3 for the purpose of washing the descending particles of crystalline adduct will vary somewhat dependent upon the amount of occlusion upon the adduct crystals, which is in turn roughly dependent upon the viscosity of the non-adducted hydrocarbons adhering to the crystals. Thus, with heavier petroleum hydrocarbons, such as lubricating oils, a larger amount of washing may be necessary than when lower molecular weight hydrocarbons such as kerosene hydrocarbons are involved.

The amount of hydrocarbon feed from storage tank 1 used for adduct washing will depend not only upon the amount required for proper washing of the adduct crystals but also upon the permissible amount of dilution of the raffinate hydrocarbons. By this is meant the permissible limits arbitrarily set for achieving the objective of the process which normally is a reduction in the pour point or freezing point of the hydrocarbon feed mixture. It will be readily seen that if an unduly large amount of hydrocarbon feed wash is employed then the raffinate hydrocarbons may not be reduced in pour point or freezing point to the desired degree. Therefore, it is preferred that the amount of washing be held to an absolute minimum consistent with the necessity for adequately washing the adduct.

The conditions present in the adduct decomposing zone 4 will depend largely upon the specific stability of the adduct being decomposed. For example, relatively low molecular weight normal hydrocarbons are more readily freed from their urea adducts than are hydrocarbons having a longer chain length. When the mixture of organic compounds is similar to or includes petroleum hydrocarbon mixtures extracted from petroleum fractions boiling in the kerosene to lubricating oil range, the urea adducts normally decompose in a temperature range between about 135° F. and 200° F. The heat necessary for effecting this decomposition is preferably applied indirectly either by heating coils inside the decomposition zone or, more preferably, by a steam jacket on the outside surface of the zone. The latter is preferred since the possibility always exists that a heat exchanger will corrode and leak and it is highly desirable to exclude contaminating fluids, such as steam or water, from the system involved in this process. The remarks relative to the proportion of hydrocarbon feed from source 1 employed as a wash liquid injected into the bottom part of the adduct decomposer 4 involve the same general considerations as those presented relative to the amount of wash liquid injected into the adduct washer. The critical limitation relative to product improvement is not as stringent in this case as with respect to the dilution of the raffinate but it is preferred that the amount of washing hydrocarbon feed be maintained at as low a level as possible for the purpose of processing efficiency.

In the operation of the embodiment of the process illustrated by FIG. 2, a hydrocarbon feed from source 1 is conducted by means of line 8 to a dryer 1A, the dryer being employed for the purpose of removing undesirably large amounts of water. The dried feed is then sent to the several parts of the process equipment as more fully set forth hereinafter. Initially, the principal portion is sent by means of line 9 to the top portion of reactor 2, a side stream of the dried feed being chilled in feed chiller 1B and then combined with urea from line 12 and make-up urea, the feed acting as the carrier for raising the crystalline urea to the reaction zone, being aided by slurry pumps 1C. The feed chiller 1B is operated in such a manner that the reaction mixture is present in the reactor at such a temperature as to be a proper adduct-forming temperature, taking into consideration the exothermic nature of the reaction. The reaction mixture which results comprises non-adducted components of the feed as a liquid phase and crystalline adducts of the substantially straight-chain components of the feed with urea. This reaction mixture is then transmitted to the adduct washer 3, at an opening intermediate the top and bottom thereof. A portion of the original feed mixture is passed by means of line 10 to the bottom part of the adduct washer and is passed upwardly therethrough so as to wash countercurrently the descending crystalline particles of the adduct. This wash liquid combines with the remaining non-adducted liquid components of the feed from which the adducted components have been separated and flows out of the adduct washer by means of line 13 to a raffinate wash zone 14. Process water is added and the raffinate is washed to remove residual amounts of contaminating adduct and/or urea. The washed raffinate is then conducted by means of line 15 to the raffinate settler 16 so as to allow the settling of any aqueous phase. The raffinate then passes by means of line 17 to the raffinate storage area 6.

The washed adduct passes from the bottom part of the adduct washer 3 to the adduct decomposing zone 4 at a point intermediate the top and bottom thereof. A further portion of the dried feed is passed by means of line 11 to the bottom part of the adduct decomposer 4 and is flowed upward countercurrent to the descending regenerated urea. The urea is regenerated from adducts introduced from the adduct washer and passed to the intermediate part of the adduct decomposer, the area being surrounded by a steam jacket 4A providing an amount of heat sufficient to cause decomposition of the adduct, thereby effecting regeneration of urea and substantially normal hydrocarbons which had been in molecular complex formation therewith. The washing portion of the feed hydrocarbons passing upwardly and washing the descending regenerated urea passes together with regenerated normal paraffin hydrocarbons out of the top portion of the adduct decomposer 4 through line 18 to the extract washing apparatus 19. Process water is added in the line and the extract combined with the washing feed is treated with water for the removal of traces of urea carryover. The mixture is sent by means of line 19A to the extract settler wherein water is settled and withdrawn and the washed extract passes from the settler 20 to the extract storage zone 7. The water washes from the raffinate settler and extract settler pass to the urea recovery zone 20A.

The following represents a typical application of the invention to the fractionation of kerosene for the purpose of preparing kerosene suitable as a jet fuel and having a substantially lower freezing point than that of the original kerosene. The individual component streams are numbered, the numbers being shown in FIG. 2 enclosed in diamonds. Water was used as the activator and urea as the adduct-forming agent. The adduct washing zones and the adduct decomposing zones were each rotating disc contactors, such as described in Reman, U.S. 2,601,678.

*Table I*

I. Process zones:

A. Operating conditions—

Temperatures of component streams: ° F.

Dried feed ⟨22⟩ ............................. 100

Chilled feed ⟨23⟩ ............................ 75

Feed entry ⟨25⟩ ............................. 100

Reactor exit ⟨26⟩ ............................ 80

Washer exit ⟨29⟩ ............................ 95

Decomposition zone 4a ....................... 175

Urea exit ⟨31⟩ .............................. 118

B. Components—

| ◇ Number | Name and constituents | Lbs./bbl. of dry feed | Bbl./bbl. of dry feed |
|---|---|---|---|
| 21 | Feed (1) to drier (1a): | | |
| | Water | 0.020 | |
| | Kerosene C₇ to C₁₈: | | |
| | n-Paraffins | 45.63 | |
| | Other hydrocarbons | 237.45 | |
| | Total | 283.10 | 1.0001 |
| 22 | Dried feed: | | |
| | Kerosene— | | |
| | n-Paraffins | 45.52 | |
| | Other hydrocarbons | 237.45 | |
| | Total | 283.08 | 1.0000 |
| 24 | Make-up water | 0.013 | |
| 25 | Reactor charge: | | |
| | Water | 0.196 | |
| | Kerosene— | | |
| | n-Paraffins | 22.80 | |
| | Other hydrocarbons | 118.64 | |
| | Urea— | | |
| | As recycled fines adduct uncombined | 61.16 | |
| | Total | 202.80 | 0.6459 |
| 26 | Reactor product: | | |
| | Water | 0.196 | |
| | Kerosene— | | |
| | n-Paraffins | 22.80 | |
| | Other hydrocarbons | 118.64 | |
| | Urea— | | |
| | In adduct | 41.56 | |
| | Uncombined | 19.60 | |
| | Total | 202.80 | |

*Table I—Continued*

| ◇ Number | Name and constituents | Lbs./bbl. of dry feed | Bbl./bbl. of dry feed |
|---|---|---|---|
| 28 | Wash: | | |
| | Kerosene— | | |
| | n-Paraffins | 17.25 | |
| | Other hydrocarbons | 89.79 | |
| | Total | 107.04 | 0.3781 |
| 29 | Washed adduct: | | |
| | Water | 0.181 | |
| | Kerosene— | | |
| | n-Paraffins | 23.90 | |
| | Other hydrocarbons | 60.11 | |
| | Urea— | | |
| | In adduct | 40.32 | |
| | Uncombined | 19.01 | |
| 37 | Raffinate product: | | |
| | Water | 0.024 | |
| | Kerosene— | | |
| | n-Paraffins | 19.32 | |
| | Other hydrocarbons | 164.76 | |
| | Total | 184.10 | 0.6475 |
| 39 | Extract product: | | |
| | Water | 0.016 | |
| | Kerosene— | | |
| | n-Paraffins | 26.31 | |
| | Other hydrocarbons | 72.69 | |
| | Total | 99.02 | 0.3526 |

The organic compounds that form adducts with urea are many and varied, and because of such reactivity any straight-chain organic compound capable of forming a solid adduct with urea can be separated from its admixture with any branched-chain or cyclic organic compound that does not form a solid adduct with urea. In determining whether any particular organic compound will or will not form an adduct with urea, it is necessary merely to admix such compound and urea, activated with a solvent as discussed hereinbefore, with agitation and then determine whether any crystalline product or adduct has formed. Obviously, such a determination is a matter of mere routine test, and it is well within the skill of the art. However, it has been found that a straight-chain organic compound having a straight aliphatic carbon atom chain containing from six to fifty carbon atoms therein will form adducts with urea in preference to branched-chain or cyclic organic compounds. Monomethylated straight-chain compounds, e.g., 4-methyl octadecane, also form urea adducts and are regarded as "substantially straight chain" compounds in this discussion. The straight-chain organic compounds can be unsubstituted hydrocarbons as well as hydrocarbons containing substituent groups, which will be discussed hereinbelow, attached to one of the two end carbon atoms of the carbon chain. Thus, one or more of such straight-chain hydrocarbons as the paraffinic hydrocarbons containing from six to fifty carbon atoms, for example, hexane, heptane, octane, nonane, decane, undecane, dodecane, tridecane, tetradecane, pentadecane, hexadecane, heptadecane, nonadecane, eicosane, heneicosane, docosane and progressively higher molecular weight straight-chain paraffins. Other compounds forming urea complexes are disclosed in the literature and patents on the subject.

On the other hand, organic mompounds containing a branched chain of carbon atoms form adducts with thiourea, and in accordance with this property they are readily separable from organic compounds containing a straight chain of carbon atoms. Thus, with thiourea branched chain hydrocarbons containing from three to fifty carbon atoms in the straight carbon atom chain portion of the molecule and also having one or more alkyl substituents therein ranging from one to twenty carbon atoms in length, for example, dimethyl butane, the dimethyl pentanes, the ethyl pentanes, trimethyl pentane, diethyl pentane, di-, tri-, and tetramethyl hexanes, the ethyl hexanes, di-, tri-, and tetraethyl hexane, ethyl heptane and other alkyl paraffins as well as methyl propene, di-, tri-, and tetramethyl butenes, etc.

We claim as our invention:

1. An improved process for the fractionation of a liquid mixture of organic compounds containing a straight-chain fraction and a non-straight chain fraction comprising introducing said mixture and a solid amide selected from the group consisting of urea and thiourea into an adduct-forming zone, contacting the solid amide and mixture to form a solid adduct of the amide with one of the fractions of the mixture, withdrawing reaction components comprising the adduct and remaining liquid fractions of the liquid mixture and passing the reaction components to a point intermediate the top and bottom of a washing zone, introducing an additional portion of the original liquid mixture as a wash for the adduct into the bottom part of the washing zone and passing it upwards countercurrent to the descending solid adduct, withdrawing the wash and remaining liquid fractions of the liquid mixture from the upper part of the washing zone, passing substantially all of the washed adduct from the bottom part of the washing zone to the top part of a decomposition zone, thermally decomposing the adduct in an area intermediate the top and bottom of said vessel, whereby liquid organic compounds and solid amide are regenerated, introducing an additional portion of the original liquid mixture into the bottom part of the decomposition zone as a wash for amide and passing it upwards countercurrent to the descending solid amide, withdrawing regenerated liquid compounds and wash, substantially devoid of solid amide, from the upper part of said zone, withdrawing amide from the bottom part of the zone and recycling it to the adduct-forming zone.

2. An improved process for the reduction in freezing point of kerosene comprising introducing solid urea, a first portion of kerosene A and an amount of water between about 0.1% and about 1%, based on the weight of urea into an adduct-forming vessel, contacting the urea, kerosene and water at a temperature between about 50° F. and about 115° F., whereby solid adducts are formed between urea and substantially straight-chain hydrocarbon components of the kerosene, withdrawing the adduct and remaining liquid non-adducted kerosene components to a vertically positioned adduct washing vessel at a point intermediate the top and bottom parts thereof, passing wash portion of kerosene A upwards from the bottom part of the vessel countercurrent to the descending adduct, removing the wash kerosene and the non-adducted components of the first portion of kerosene A from the top of the vessel as a kerosene having a freezing point substantially lower than that of kerosene A, passing substantially all of the washed adduct from the bottom of the vessel to a zone intermediate the top and bottom part of a vertically positioned adduct decomposing vessel, the zone being heated to an adduct decomposing temperature between about 135° F. and about 200° F., whereby solid urea and liquid substantially straight-chain hydrocarbons are regenerated, passing another wash portion of kerosene A from the bottom part of the vessel upwards therethrough countercurrent to descending solid urea, removing the wash and regenerated hydrocarbons, substantially devoid of solid urea, from the top part of the vessel and recycling washed urea from the bottom part of the vessel to the adduct-forming vessel.

3. A process according to claim 1 wherein the washing zone and decomposition zone are vertically disposed rotating disc contactors.

4. A process according to claim 3 wherein the organic compounds are petroleum lubricating oil hydrocarbons, and wherein 1–5% of a lower aliphatic alcohol, based on the weight of lubricating oil is introduced into the adduct-forming zone.

5. A process according to claim 1 wherein the weight ratio of urea to substantially straight-chain hydrocarbons is between about 1 and about 5.

References Cited in the file of this patent

UNITED STATES PATENTS

| | | |
|---|---|---|
| 2,735,843 | Weedman | Feb. 21, 1956 |
| 2,890,161 | Brown et al. | June 9, 1959 |
| 2,913,390 | Brunstum | Nov. 17, 1959 |
| 2,917,447 | Hoppe et al. | Dec. 15, 1959 |